United States Patent
Nagata et al.

(10) Patent No.: US 11,840,229 B1
(45) Date of Patent: Dec. 12, 2023

(54) VEHICLE CONTROL APPARATUS

(71) Applicant: TOYOTA JIDOSHA KABUSHIKI KAISHA, Toyota (JP)

(72) Inventors: Koji Nagata, Okazaki (JP); Keita Sasaki, Seto (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 18/134,268

(22) Filed: Apr. 13, 2023

(30) Foreign Application Priority Data

Jun. 17, 2022 (JP) .................................. 2022-098208

(51) Int. Cl.
| | |
|---|---|
| *B60W 30/18* | (2012.01) |
| *B60W 10/02* | (2006.01) |
| *B60W 10/06* | (2006.01) |
| *F02D 41/12* | (2006.01) |
| *F02D 41/02* | (2006.01) |

(52) U.S. Cl.
CPC .. *B60W 30/18009* (2013.01); *B60W 10/0235* (2020.02); *B60W 10/06* (2013.01); *F02D 41/0235* (2013.01); *F02D 41/123* (2013.01); *B60W 2510/068* (2013.01); *B60W 2710/021* (2013.01); *B60W 2710/025* (2013.01); *B60W 2710/0627* (2013.01); *F02D 2200/0802* (2013.01)

(58) Field of Classification Search
CPC ............ B60W 10/0235; B60W 10/06; B60W 30/18009; B60W 2510/068; B60W 2710/021; B60W 2710/025; B60W 2710/0627; F02D 41/0235; F02D 41/123; F02D 2200/0802
See application file for complete search history.

(56) References Cited

U.S. PATENT DOCUMENTS

| | | | |
|---|---|---|---|
| 5,626,536 A * | 5/1997 | Kono ................... | B60W 10/02 192/3.3 |
| 2011/0077841 A1* | 3/2011 | Minami .............. | F02D 41/2441 701/104 |
| 2018/0201269 A1* | 7/2018 | Matsubara ...... | B60W 30/18072 |
| 2020/0240343 A1 | 7/2020 | Iwasaki et al. | |

FOREIGN PATENT DOCUMENTS

JP 2020-118095 A 8/2020

* cited by examiner

*Primary Examiner* — Edwin A Young
(74) *Attorney, Agent, or Firm* — Finnegan, Henderson, Farabow, Garrett & Dunner, LLP

(57) ABSTRACT

An electronic control unit carries out deceleration fuel cutoff for stopping fuel injection in an engine, and deceleration lockup for engaging a lockup clutch, at the time of deceleration of a vehicle. The electronic control unit then ends deceleration fuel cutoff and deceleration lockup upon fulfillment of a recovery condition, On the other hand, when a request to restrain heat-up of a filter device is made before fulfillment of the recovery condition, the electronic control unit stops deceleration fuel cutoff, but continues deceleration lockup.

5 Claims, 3 Drawing Sheets

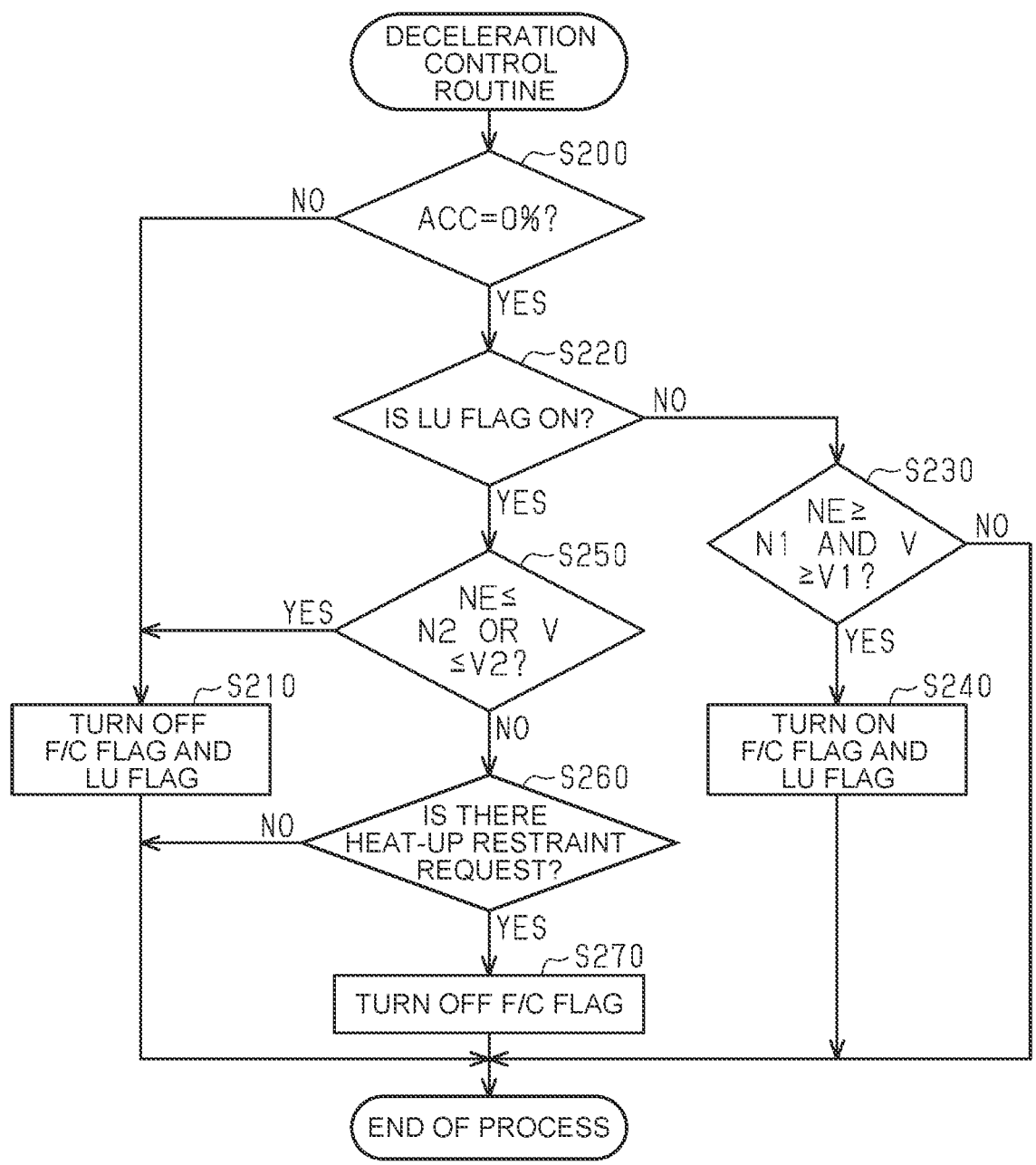

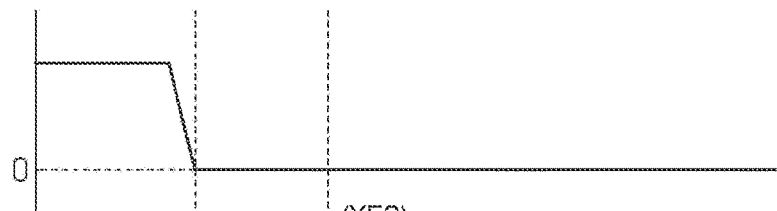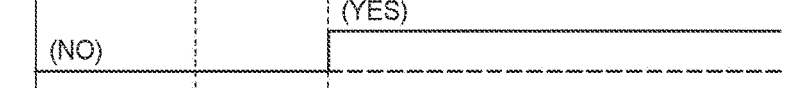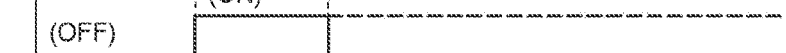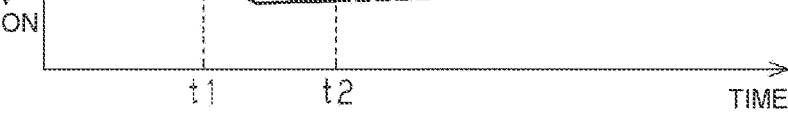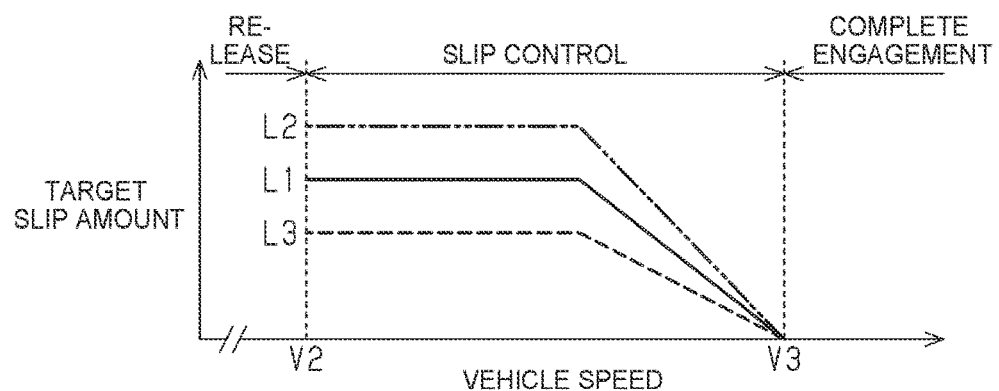

VEHICLE CONTROL APPARATUS

CROSS-REFERENCE TO RELATED APPLICATION

This application claims priority to Japanese Patent Application No. 2022-098208 filed on Jun. 17, 2022 incorporated herein by reference in its entirety.

BACKGROUND

1. Technical Field

The disclosure relates to a vehicle control apparatus.

2. Description of Related Art

By the way, there is a vehicle equipped with a lockup clutch that mechanically engages an engine and a transmission with each other. In this vehicle, with a view to prolonging the time of fuel cutoff during deceleration, deceleration lockup for engaging the lockup clutch may be carried out at the time of deceleration.

As a vehicle control apparatus that carries out such deceleration lockup, there is known an apparatus described in Japanese Unexamined Patent Application Publication No. 2020-118095 (JP 2020-118095 A). An engine of a vehicle to be controlled by the vehicle control apparatus of the document is equipped with a filter device that collects particulate matter (PM) in exhaust gas. Moreover, the vehicle control apparatus stops fuel cutoff and resumes combustion in the engine when there arises a need to restrain the temperature of the filter device from rising while fuel cutoff is carried out. Furthermore, the vehicle control apparatus releases the lockup clutch simultaneously with stopping fuel cutoff.

SUMMARY

When a transition is made from a state where fuel cutoff for the engine is carried out and the lockup clutch is engaged to a state where the engine is operated through combustion and the lockup clutch is released, the effect of engine brake weakens. Therefore, when fuel cutoff is stopped while deceleration lockup is carried out, a change in the feeling of deceleration of the vehicle may cause a passenger to develop a feeling of strangeness.

A vehicle control apparatus that solves the foregoing problem is an apparatus that controls a vehicle having a lockup clutch that mechanically couples an engine and a transmission to each other. The vehicle control apparatus performs a deceleration fuel cutoff process, that is, a process of carrying out fuel cutoff for the engine during deceleration of the vehicle, and a deceleration lockup process, that is, a process of engaging the lockup clutch while fuel cutoff is carried out through the deceleration fuel cutoff process. The rotational speed of the engine is restrained from falling, by engaging the lockup clutch while fuel cutoff is carried out. Moreover, the period of fuel cutoff can thus be prolonged. Incidentally, in the deceleration fuel cutoff process, fuel cutoff is ended to resume combustion in the engine upon fulfillment of a prescribed recovery condition.

Besides, the vehicle control apparatus performs a continuation process, that is, a process of continuing to hold the lockup clutch engaged after resumption of combustion in the engine as well, when fuel cutoff through the deceleration fuel cutoff process is stopped before fulfillment of the recovery condition. When the lockup clutch is disengaged as soon as fuel cutoff is stopped, the deceleration of the vehicle decreases substantially. As a measure against this, with the vehicle control apparatus, the lockup clutch is held engaged after the stop of fuel cutoff as well, so the deceleration of the vehicle is restrained from decreasing after the stop of fuel cutoff. Accordingly, the vehicle control apparatus has an effect of restraining the deceleration of the vehicle from changing as a result of the stop of deceleration fuel cutoff.

In the case where the engine is equipped with a filter device that collects particulate matter in exhaust gas, fuel cutoff is stopped before fulfillment of the recovery condition, for example, when the temperature of the filter device is estimated to be equal to or higher than a prescribed value.

The vehicle control apparatus may be configured to perform slip control for subjecting the engagement force of the lockup clutch to feedback control to make the slip amount of the lockup clutch equal to a target slip amount. In this case, the vehicle control apparatus may be configured to perform the slip control with a larger value set as a value of the target slip amount when the slip control is performed while the lockup clutch continues to he held engaged through the continuation process than when the slip control is performed while fuel cutoff is carried out. Alternatively, the vehicle control apparatus that performs the slip control may be configured to perform the slip control with a smaller value set as a value of the target slip amount when the slip control is performed while the lockup clutch continues to be held engaged through the continuation process than when the slip control is performed while fuel cutoff is carried out. Furthermore, the vehicle control apparatus that performs the slip control may be configured to perform the slip control with the same value as in a case where the fuel cutoff is carried out without being stopped set as a value of the target slip amount, when the slip control is performed while the lockup clutch continues to be held engaged through the continuation process.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a flowchart of a deceleration control routine that is executed by the vehicle control apparatus;

FIG. 4A is a time chart showing changes in accelerator depression amount during deceleration control in the vehicle control apparatus;

FIG. 4B is a time chart showing changes in the presence or absence of a request to restrain heat-up of a filter device during deceleration control in the vehicle control apparatus;

FIG. 4C is a time chart showing changes in an FIC flag during deceleration control in the vehicle control apparatus;

FIG. 4D is a time chart showing changes in an LU flag during deceleration control in the vehicle control apparatus;

FIG. 4E is a time chart showing changes in the rotational speed of an engine during deceleration control in the vehicle control apparatus;

FIG. 4F is a time chart showing changes in the acceleration of a vehicle during deceleration control in the vehicle control apparatus; and FIG. 5 is graph showing a mode of setting a target slip amount.

DETAILED DESCRIPTION OF EMBODIMENTS

A vehicle control apparatus according to one of the embodiments will be described hereinafter in detail with reference to FIGS. 1 to 4F.

Configuration of Drive Train of Vehicle

Figure 1:
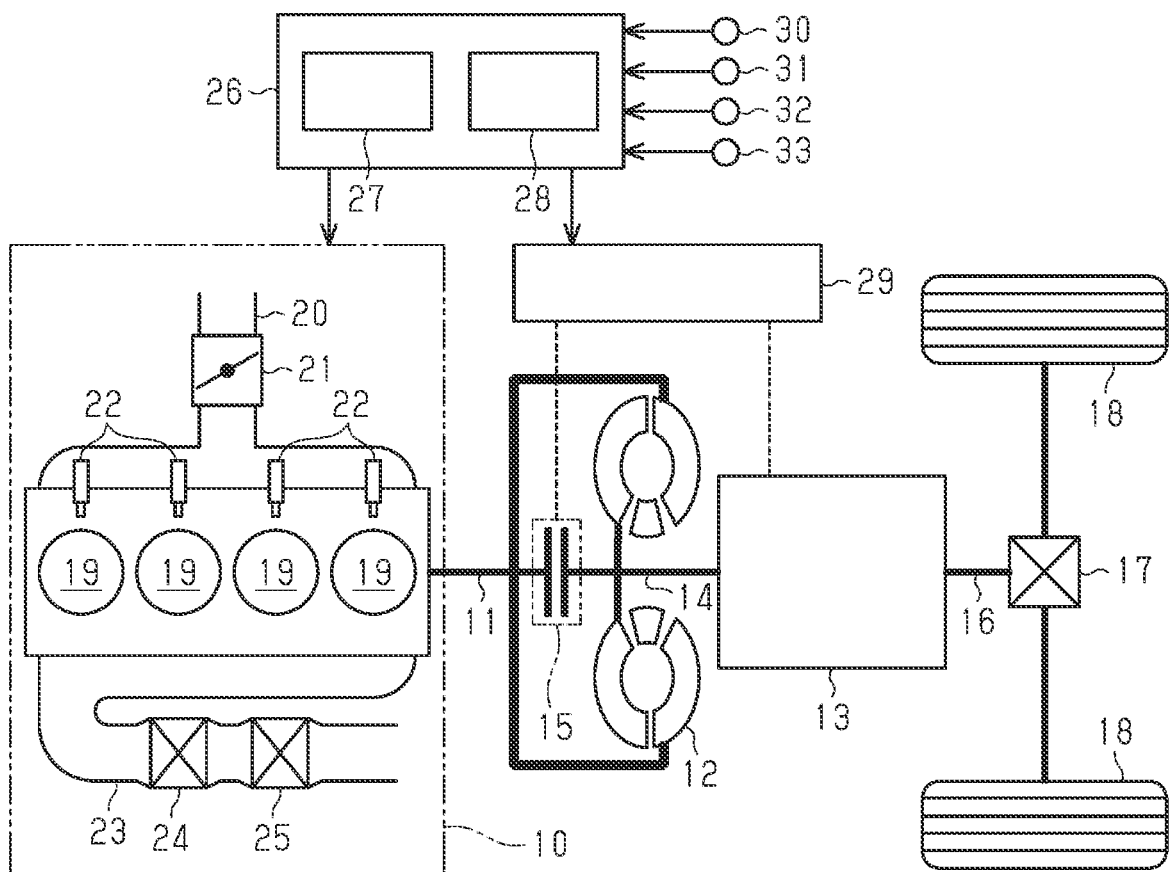
FIG. 1 is a view schematically showing the configuration of a vehicle control apparatus according to one of the embodiments.

Referring first to FIG. 1, the configuration of a drive train of a vehicle to which the vehicle control apparatus according to the present embodiment is applied will be described. The vehicle is mounted with an engine 10. A crankshaft 11 that is an output shaft of the engine 10 is coupled to a transmission input shaft 14 that is an input shaft of an automatic transmission 13 via a torque converter 12 that is a fluid coupling with the effect of torque amplification. The torque converter 12 is provided with a lockup clutch 15 that mechanically couples the engine 10 and the automatic transmission 13 to each other. The lockup clutch 15 is engaged upon being supplied with hydraulic oil, and mechanically couples the crankshaft 11 and the transmission input shaft 14 to each other. On the other hand, a transmission output shaft 16 that is an output shaft of the automatic transmission 13 is coupled to right and left wheels 18 via a differential 17. Incidentally, an oil pressure control circuit 29 that controls the pressure of hydraulic oil in the lockup clutch 15 and the automatic transmission 13 is installed in the vehicle.

The engine 10 is equipped with a plurality of cylinders 19 in which combustion is carried out, an intake passage 20 that is a passage for introducing intake gas into the respective cylinders 19, and an exhaust passage 23 that is a passage for discharging exhaust gas from the respective cylinders 19. Besides, the engine 10 is provided with injectors 22 that inject fuel into intake gas, for the cylinders 19 respectively. In the intake passage 20, a throttle valve 21 for adjusting the flow rate of intake gas flowing inside the intake passage 20 is installed. A catalyst device 24 for controlling the properties of exhaust gas is installed in the exhaust passage 23. Besides, a filter device 25 that collects particulate matter (PM) in exhaust gas is installed in the exhaust passage 23 in a region downstream of the catalyst device 24.

Configuration of Vehicle Control Apparatus

An electronic control unit 26 as the vehicle control apparatus is installed in the vehicle. The electronic control unit 26 is configured as an electronic control unit having an arithmetic processing device 27 and a storage device 28. Programs and data for controlling the vehicle are stored in the storage device 28. The arithmetic processing device 27 performs various processes for controlling the vehicle, by reading the programs from the storage device 28 and executing the programs.

Detection signals of sensors installed at various portions of the vehicle, such as a crank angle sensor 30, an input rotational speed sensor 31, a vehicle speed sensor 32, and an accelerator pedal sensor 33 are input to the electronic control unit 26. The crank angle sensor 30 is a sensor that detects a rotational phase of the crankshaft 11. Incidentally, the electronic control unit 26 computes an engine rotational speed NE, namely, a rotational speed of the crankshaft 11, based on a detection result of the crank angle sensor 30. The input rotational speed sensor 31 is a sensor that detects an input rotational speed NE, namely, a rotational speed of the transmission input shaft 14. The vehicle speed sensor 32 is a sensor that detects a vehicle speed V, namely, a running speed of the vehicle. The accelerator pedal sensor 33 is a sensor that detects an accelerator depression amount ACC, namely, an amount of operation of an accelerator pedal by a driver.

The electronic control unit 26 controls the behavior of the engine 10, the lockup clutch 15, the automatic transmission 13, and the like, based on detection results of these sensors. In concrete terms, the electronic control unit 26 controls the behavior of the engine 10 through operation of the opening degree of the throttle valve 21, the fuel injection amount of the injectors 22, and the like. Besides, the electronic control unit 26 controls the behavior of the lockup clutch 15 and the automatic transmission 13 through operation of the oil pressure control circuit 29.

Restraint of Heat-Up of Filter Device 25

The electronic control unit 26 carries out deceleration fuel cutoff for temporarily stopping fuel injection in the engine 10 at the time of deceleration of the vehicle. Besides, the electronic control unit 26 carries out deceleration lockup for engaging the lockup clutch 15 to prolong the time of fuel cutoff, at the time of deceleration of the vehicle.

On the other hand, the engine 10 is equipped with the filter device 25 that collects PM in exhaust gas, as described above, When fuel cutoff is carried out, the exhaust gas flowing in the exhaust passage 23 is replaced with fresh air, and the filter device 25 is supplied with oxygen. The PM deposited in the filter device 25 is burned by the supplied oxygen. When fuel cutoff is continued for a long time with a large amount of PM deposited in the filter device 25, the filter device 25 may be overheated through the generation of heat resulting from the combustion of PM. As a measure against this, the electronic control unit 26 requests restraint of heat-up of the filter device 25 when the continuation of fuel cutoff may lead to the overheat of the filter device 25. The electronic control unit 26 then restrains the filter device 25 from being overheated, by stopping fuel cutoff in accordance with the request.

Figure 2:
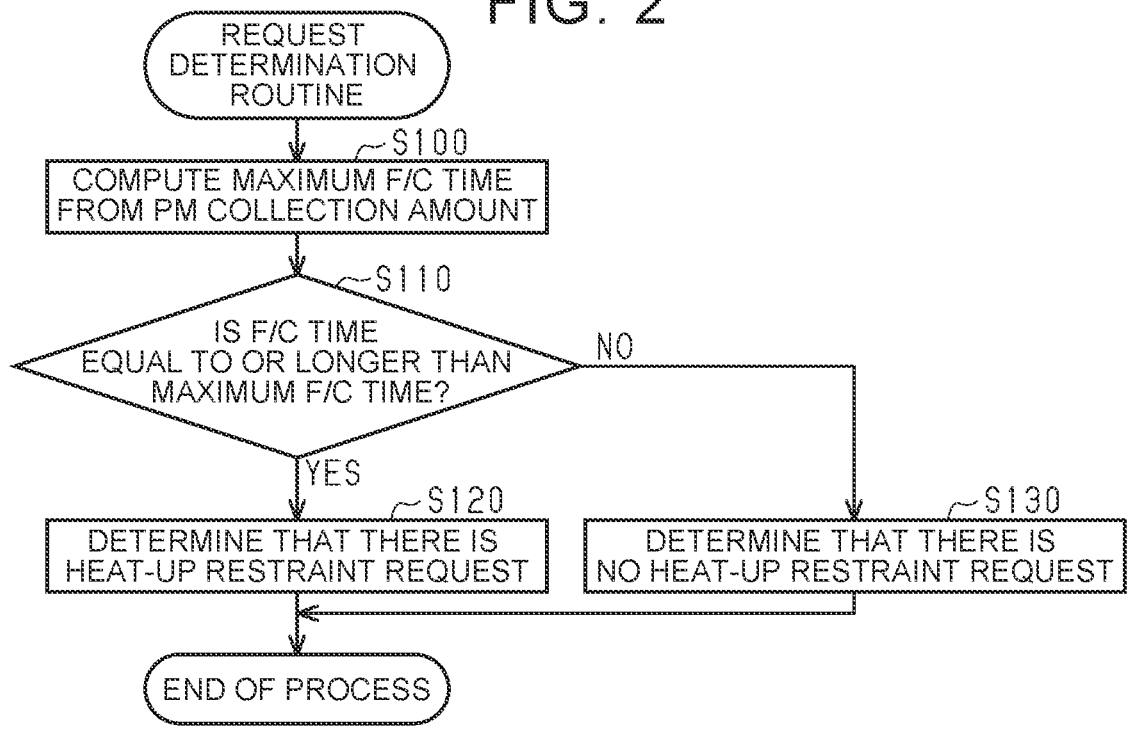
FIG. 2 is a flowchart of a request determination routine that is executed by the vehicle control apparatus.

FIG. 2 is a flowchart of a request determination routine that is executed by the electronic control unit 26 to determine whether to request restraint of heat-up of the filter device 25 or not. The filter device 25 repeatedly executes the present routine on a prescribed control cycle, during the running of the vehicle.

Upon starting the present routine, the electronic control unit 26 first computes a maximum F/C time, based on a PM collection amount in the filter device 25, in step S100. The electronic control unit 26 estimates the PM collection amount in the filter device 25, based on an operating state of the engine 10, for example, an intake air amount or an air-fuel ratio. The maximum F/C time represents a maximum value of the duration time of fuel cutoff that can be carried out without overheating the filter device 25. Moreover, the electronic control unit 26 computes, as the maximum F/C time, a time that is shorter when the PM collection amount is large than when the PM collection amount is small.

Subsequently, the electronic control unit 26 determines whether or not an F/C time is equal to or longer than the maximum F/C time in step S110. The F/C time represents a duration time of fuel cutoff to the present. The F/C time is "0" when fuel cutoff is not being carried out. Then, if the F/C time is equal to or longer than the maximum F/C time (YES), the electronic control unit 26 determines that there is a request to restrain heat-up of the filter device 25, and ends the process of the present routine on the current control cycle, in step S120. On the other hand, if the F/C time is shorter than the maximum F/C time (NO), the electronic control unit 26 determines that there is no request to restrain heat-up of the filter device 25, and ends the process of the present routine on the current control cycle, in step S130. Incidentally, as described above, the maximum F/C time is computed as a maximum value of the duration time of fuel cutoff that can be carried out without overheating the filter device 25. In consequence, when the WC time is equal to or longer than the maximum F/C time, the temperature of the filter device 25 is estimated to be equal to or longer than a temperature at which the filter device 25 is regarded as being overheated.

Deceleration Control

Next, the control performed at the time of deceleration of the vehicle, such as deceleration fuel cutoff and deceleration lockup will be described with reference to FIG. 3. FIG. 3 is a flowchart of a deceleration control routine that is executed by the electronic control unit 26 for the control performed at the time of deceleration of the vehicle. The electronic control unit 26 repeatedly executes the present routine on a prescribed control cycle, during the running of the vehicle.

Upon starting the present routine, first in step S200, the electronic control unit 26 determines whether or not the accelerator depression amount ACC is "0%". That is, the electronic control unit 26 determines whether or not the driver has refrained from depressing the accelerator pedal, in step S200. Then, if the accelerator depression amount ACC is not "0%" (NO), the electronic control unit 26 turns off an F/C flag, an LU flag, and an F/C stop flag, and ends the process of the present routine on the current control cycle, in step S210.

Incidentally, the F/C flag is a flag indicating whether or not deceleration fuel cutoff is being carried out. The electronic control unit 26 starts deceleration fuel cutoff when the F/C flag turns from off to on. Besides, the electronic control unit 26 ends deceleration fuel cutoff and resumes combustion in the engine 10 when the F/C flag turns from on to off. On the other hand, the LU flag is a flag indicating whether or not deceleration lockup is being carried out. The electronic control unit 26 starts deceleration lockup when the LU flag turns from off to on. Besides, the electronic control unit 26 ends deceleration lockup when the LU flag turns from on to off. As described above, if the accelerator depression amount ACC is not "0%" (NO in S200), the F/C flag and the LU flag are turned off in step S210. In consequence, deceleration fuel cutoff and deceleration lockup are ended in response to depression of the accelerator pedal by the driver.

On the other hand, if the accelerator depression amount ACC is "0%" (YES in S200), the electronic control unit 26 determines whether or not the LU flag is on, in step S220. Then, the electronic control unit 26 advances the process to step S250 if the LU flag is on (YES), and advances the process to step S230 if the LU flag is off (NO).

In the case where the process is advanced to step S230 on the grounds that the LU flag is off, the electronic control unit 26 determines whether or not the engine rotational speed NE is equal to or higher than "N1" and the vehicle speed V is equal to or higher than "V1", in step S230. "N1" denotes an F/C start rotational speed that is a lower limit of the engine rotational speed NE at which deceleration fuel cutoff is started. Besides, "V1" denotes an F/C start vehicle speed that is a lower limit of the vehicle speed V at which deceleration fuel cutoff is started. If the engine rotational speed NE is equal to or higher than "N1" and the vehicle speed V is equal to or higher than "V1" (YES in S230), the electronic control unit 26 advances the process to step S240. The electronic control unit 26 then turns on the F/C flag and the LU flag and ends the process of the present routine on the current control cycle in step S240. Besides, if the engine rotational speed NE is lower than "N1" or the vehicle speed V is low than "V1" (NO in S230), the electronic control unit 26 directly ends the process of the present routine on the current control cycle. As described hitherto, the electronic control unit 26 starts deceleration fuel cutoff and deceleration lockup when the accelerator depression amount ACC becomes equal to "0%" while the engine rotational speed NT is equal to or higher than "N1" and the vehicle speed V is equal to or higher than "V1".

In contrast, in the case where the process is advanced to step S250 on the grounds that the LU flag is on, the electronic control unit 26 determines whether or not the engine rotational speed NE is equal to or lower than "N2" or the vehicle speed V is equal to or lower than "V2", in step S250. "N2" denotes an F/C recovery rotational speed that is a lower limit of the engine rotational speed NE at which deceleration fuel cutoff is carried out. A positive value smaller than "N1" is set as "N2". On the other hand, "V2" denotes an F/C recovery vehicle speed that is a lower limit of the vehicle speed V at which deceleration fuel cutoff is carried out. A positive value smaller than "V1" is set as "V2". Then, if the engine rotational speed NE is equal to or lower than "N2" or the vehicle speed V is equal to or lower than "V2" (YES in S250), the electronic control unit 26 advances the process to step S210. That is, the electronic control unit 26 ends deceleration lockup either when the engine rotational speed NE is equal to or lower than "N2" or when the vehicle speed V is equal to or lower than "V2". Besides, in this case, the electronic control unit 26 also ends deceleration fuel cutoff when the WC flag is on and deceleration fuel cutoff is being carried out.

On the other hand, if the engine rotational speed NE is higher than "N2" and the vehicle speed V is higher than "V2" (NO in S250), the electronic control unit 26 advances the process to step S260. The electronic control unit 26 then determines whether or not there is a heat-up restraint request to restrain heat-up of the filter device 25, in step S260. If there is no heat-up restraint request (NO), the electronic control unit 26 directly ends the process of the present routine on the current control cycle. In this case, the electronic control unit 26 continues deceleration lockup. Besides, in this case, the electronic control unit 26 also continues deceleration fuel cutoff when deceleration fuel cutoff is being carried out.

In contrast, if there is a heat-up restraint request (YES in S250), the electronic control unit 26 turns off the F/C flag and then ends the process of the present routine on the current control cycle, in step S270. As described hitherto, the electronic control unit 26 ends deceleration fuel cutoff when a request to restrain heat-up of the filter device 25 is made. It should be noted, however, that the LU flag is held on in this case. That is, the electronic control unit 26 continues deceleration lockup even when a request to restrain heat-up of the filter device 25 is made.

Incidentally, in the present embodiment, a deceleration fuel cutoff process for carrying out fuel cutoff in the engine 10 during deceleration of the vehicle is started, by turning on the F/C flag in step S240 of FIG. 3. Besides, a deceleration lockup process for engaging the lockup clutch 15 while fuel cutoff is carried out through the deceleration fuel cutoff process is started, by turning on the LU flag in step S240. Furthermore, combustion in the engine 10 is resumed when a request to stop fuel cutoff is made while this fuel cutoff is carried out through the deceleration fuel cutoff process, by turning off the F/C flag in step S270 of FIG. 3. Moreover, a continuation process for continuing to hold the lockup clutch 15 engaged even after resumption of combustion in the engine 10 is performed, by refraining from operating the LU flag in step S270.

Operation and Effects of Embodiment

The operation and effect of the present embodiment will be described. FIGS. 4A to 4F show changes in the following parameters at the time of deceleration of the vehicle respectively. Incidentally, HG. 4A shows changes in the accelerator depression amount ACC, FIG. 4B shows changes in the heat-up restraint request, FIG. 4C shows changes in the F/C flag, FIG. 4D shows changes in the LU flag, FIG. 4E shows changes in the engine rotational speed NE, and FIG. 4F shows changes in the acceleration of the vehicle. In the case of FIGS. 4A to 4F, the accelerator depression amount ACC becomes equal to "0%" at time t1 during the running of the vehicle, and the F/C flag and the LU flag are thereby turned from off to on. That is, deceleration fuel cutoff and deceleration lockup are started at time t1.

As described above, when there is no request to restrain heat-up of the filter device 25, the INC flag is turned from on to off when one of the following situations (i) to (iii) occurs. In the situation (i), the engine rotational speed NE is equal to or lower than "N2". In the situation (ii), the vehicle speed V is equal to or lower than "V2". In the situation (iii), the accelerator depression amount ACC assumes a value other than "0%", namely, the accelerator pedal has been depressed. In the deceleration fuel cutoff process, the occurrence of any one of the situations (i) to (iii) is a condition for recovering deceleration fuel cutoff. On the other hand, when the temperature of the filter device 25 is estimated to be equal to or higher than a prescribed temperature, the restraint of heat-up of the filter device 25 is requested in the request determination routine of FIG. 2. In this case, the deceleration fuel cutoff process is stopped before fulfillment of the aforementioned recovery condition.

As indicated by a broken line in FIG. 4B, when the restraint of heat-up of the filter device 25 remains unrequested at and after time t1, both deceleration fuel cutoff and deceleration lockup are continued until the recovery condition is fulfilled. FIG. 4C shows, with a broken line, changes in the F/C flag in this case. FIG. 4F shows, with a broken line, changes in the acceleration of the vehicle in this case.

A case where a request to restrain heat-up of the filter device 25 is made at time t2 when deceleration fuel cutoff and deceleration lockup are being carried out as indicated by a solid line in FIG. 4B will now be considered. The electronic control unit 26 turns off the F/C flag and stops deceleration fuel cutoff as indicated by a solid line in FIG. 4C, when a request to restrain heat-up of the filter device 25 is made at time t2 before fulfillment of the recovery condition. When combustion in the engine 10 is resumed upon the end of deceleration fuel cutoff, the filter device 25 is stopped from being supplied with oxygen, and the deposited PM ceases to burn. Therefore, the filter device 25 is restrained frons being further heated up.

On the other hand, the electronic control unit 26 prolongs the period of fuel cutoff by carrying out deceleration lockup as well as deceleration fuel cutoff and thus restraining the engine rotational speed NE from falling. In the case where deceleration fuel cutoff is stopped in accordance with the request to restrain heat-up of the filter device 25, there is no need to continue deceleration lockup as far as the purpose of prolonging the period. of fuel cutoff is concerned.

A case where the LU flag is also turned off and deceleration lockup is also stopped at time t2 when the RC flag is turned off as indicated by an alternate long and two short dashes line in FIG. 4D will now be considered. Incidentally, FIG. 4E shows, with an alternate long and two short dashes line, changes in the engine rotational speed NE in this case, and FIG. 4F shows, with an alternate long and two short dashes line, changes in the deceleration of the vehicle in this case. The accelerator depression amount ACC remains equal to "0%" at and after time t2 as well, so idling operation of the engine 10 is performed after the resumption of combustion. Therefore, when deceleration lockup is also stopped simultaneously with the stop of deceleration fuel cutoff, the engine rotational speed NE rapidly falls to a speed close to an idling rotational speed. Then, when the lockup clutch 15 is released, the effect of engine brake weakens, so the deceleration of the vehicle decreases substantially.

In contrast, the vehicle control apparatus according to the present embodiment continues deceleration lockup when deceleration fuel cutoff is stopped before fulfillment of the recovery condition. FIG. 4D shows, with a solid line, changes in the LU flag in the case of the present embodiment. FIG. 4F shows, with a solid line, changes in the acceleration of the vehicle in the case of the present embodiment. The deceleration of the vehicle after stopping deceleration fuel cutoff in this case is lower than in the case where deceleration fuel cutoff is continued. However, since deceleration lockup is continued, the deceleration of the vehicle decreases to be lower than in the case where deceleration lockup as well as deceleration fuel cutoff is stopped, in a limited manner.

The following effects can he obtained according to the vehicle control apparatus of the present embodiment described above.

(1) In the present embodiment, deceleration lockup is continued when deceleration fuel cutoff is stopped and combustion in the engine 10 is resumed before fulfillment of the recovery condition. Thus, the change in the deceleration of the vehicle resulting from the stop of deceleration fuel cutoff is small. Consequently, the drivability is restrained from deteriorating due to changes in the deceleration of the vehicle.

(2) In the present embodiment, deceleration fuel cutoff is stopped when the temperature of the filter device 25 is estimated to be equal to or higher than the prescribed temperature. In consequence, the filter device 25 can be prevented from being overheated.

Other Embodiments

The present embodiment can be carried out after being modified in the following manner. The present embodiment and the following modification examples can he carried out in combination with one another within such a range that there is no technical contradiction.

Slip Control of Lockup Clutch 15

In engaging the lockup clutch 15 for deceleration lockup, slip control may be performed. Slip control is designed to create a slipping state where the lockup clutch 15 slips slightly. In performing slip control, the electronic control unit 26 sets a target slip amount that is a target value of a slip amount that is a difference between the rotational speed of the crankshaft 11 and the rotational speed of the transmission input shaft 14. Besides, the electronic control unit 26 obtains an actual value of the slip amount, based on detection results of the crank angle sensor 30 and the input rotational speed sensor 31. The electronic control unit 26 then performs feedback control of the engagement force of the lockup clutch 15 such that the actual value of the slip amount approaches the target slip amount. Incidentally, in more strict terms, the electronic control unit 26 performs feedback control of the pressure of hydraulic oil supplied to the lockup clutch 15 by the oil pressure control circuit 29, at this time. An aspect of the configuration of the vehicle control apparatus in the case where slip control is performed at the time of deceleration lockup will be presented hereinafter.

A line L1 in FIG. 5 indicates an example of a mode of setting the target slip amount in slip control. In this case, the target slip amount is set based on the vehicle speed V. Besides, in this case, slip control is performed within a range where the prescribed vehicle speed V is equal to or lower than "V3". Moreover, the lockup clutch 15 is completely engaged such that the crankshaft 11 and the transmission input shaft 14 rotate in synchronization with each other, within a range where the vehicle speed V is higher than "V3".

Incidentally, the electronic control unit 26 performs a continuation process for continuing to hold the lockup clutch 15 engaged even after combustion in the engine 10 is resumed in response to a request to stop deceleration fuel cutoff, as described above. That is, slip control is performed either during deceleration lockup through the continuation process after the resumption of combustion or during deceleration fuel cutoff. In the following description, slip control in the former case will be referred to as post-F/C stop slip control. Besides, slip control in the latter case will he referred to as F/C continuation slip control. The target slip amount in each of INC continuation slip control and post-P/C stop slip control may be set according to one of the following setting modes 1 to 3.

Setting Mode 1

In performing post-FIC stop slip control, a larger value is set as the value of the target slip amount than in the case where F/C continuation slip control is performed. For example, in F/C continuation slip control, the target slip amount is set according to the mode indicated by the line L1 in FIG. 5. Moreover, in post-F/C stop slip control, the target slip amount is set according to the mode indicated by a line L2 in FIG. 5. Fluctuations in the rotational speed of the engine 10 are likely to occur immediately after the resumption of combustion in the engine 10. The likelihood of fluctuations in the rotational speed of the engine 10 being transmitted to a power transmission system of the vehicle increases as the degree of engagement of the lockup clutch 15 increases. Then, when rotational fluctuations are transmitted to the power transmission system, a vehicle body may vibrate or make noise.

On the other hand, when a large value is set as the target slip amount, the degree of engagement of the lockup clutch 15 decreases. In consequence, when the target slip amount is set as described above, the vehicle body can be restrained from vibrating or making noise due to fluctuations in rotational speed of the engine 10 immediately after the resumption of combustion.

Setting Mode 2

In performing post-F/C stop slip control, a smaller value is set as the value of the target slip amount than in the case where F/C continuation slip control is performed. For example, in F/C continuation slip control, the target slip amount is set according to the mode indicated by the line L1 in FIG. 5. On the other hand, in post F/C stop slip control, the target slip amount is set according to the mode indicated by a line L3 in FIG. 5. In this case, the amount of decrease in deceleration of the vehicle resulting from the stop of deceleration fuel cutoff is small.

Setting Mode 3

The target slip amount is set according to the same mode in both post-F/C stop slip control and F/C continuation slip control. That is, even when post-F/C stop slip control is performed, the same value as in the case where F/C continuation slip control is assumed to be performed may be set as the value of the target slip amount. For example, the target slip amount is set according to the mode indicated by the line L1 in FIG. 5 in both F/C continuation slip control and post-F/C stop slip control. In this case, there is no need to change over the contents of slip control depending on whether deceleration fuel cutoff is being carried out or has been stopped, so slip control can be deigned easily.

Incidentally, while deceleration lockup is carried out, the lockup clutch 15 may be held engaged completely, without performing slip control.

As for Stop of Deceleration Fuel Cutoff

In the aforementioned embodiment, when a request to restrain heat-up of the filter device 25 is made, deceleration fuel cutoff is stopped before fulfillment of the recovery condition. Deceleration fuel cutoff may be stopped on other conditions. For example, a request to stop deceleration fuel cutoff may be made to resume combustion in the engine 10 when the temperature of coolant in the engine 10 becomes equal to or lower than a threshold. When deceleration fuel cutoff lasts for a long time under an environment at extremely low temperatures, the temperature of the engine 10 may fall to such an extent that the engine 10 cannot be restarted smoothly, or the temperature of the catalyst device 24 may fall until the catalyst is deactivated. In consequence, if a request to stop deceleration fuel cutoff is made when the temperature of coolant in the engine 10 becomes equal to or lower than the threshold while deceleration fuel cutoff is carried out, the re-startability of the engine 10 or the emission properties of exhaust gas can be restrained from deteriorating after the end of fuel cutoff. In any case, when deceleration fuel cutoff is stopped before fulfillment of the recovery condition, the drivability is restrained from deteriorating due to changes in deceleration of the vehicle, by continuing deceleration lockup after the resumption of combustion as well.

As for Setting of Target Slip Amount

In the aforementioned embodiment, the target slip amount is set based on the vehicle speed V. However, the target slip amount may be set based on another parameter, for example, the engine rotational speed NE. Besides, the target slip amount may be a fixed value. In this case as well, a value that differs depending on whether F/C continuation slip control or post-F/C stop slip control is performed may be set as the value of the target slip amount.

What is claimed is:

1. A vehicle control apparatus that controls a vehicle having a lockup clutch that mechanically couples an engine and a transmission to each other, the vehicle control apparatus being configured to perform:

a deceleration fuel cutoff process, that is, a process of carrying out fuel cutoff for the engine during deceleration of the vehicle and ending the fuel cutoff to resume combustion in the engine when a prescribed recovery condition is fulfilled;

a deceleration lockup process, that is, a process of engaging the lockup clutch while the fuel cutoff is carried out through the deceleration fuel cutoff process, and a continuation process, that is, a process of continuing to hold the lockup clutch engaged after resumption of combustion in the engine as well, when the fuel cutoff through the deceleration fuel cutoff process is stopped before fulfillment of the recovery condition.

2. The vehicle control apparatus according to claim 1, wherein the engine is equipped with a filter device that collects particulate matter in exhaust gas, and the fuel cutoff is stopped before fulfillment of the recovery condition when a temperature of the filter device is estimated to be equal to or higher than a prescribed temperature.

3. The vehicle control apparatus according to claim 1 that performs slip control in which an engagement force of the lockup clutch is subjected to feedback control to make a slip amount of the lockup clutch equal to a target slip amount, and that performs the slip control with a larger value set as a value of the target slip amount when the slip control is performed while the lockup clutch continues to be held engaged through the continuation process than when the slip control is performed while the fuel cutoff is carried out.

4. The vehicle control apparatus according to claim 1 that performs slip control which an engagement force of the lockup clutch is subjected to feedback control to make a slip amount of the lockup clutch equal to a target slip amount, and that performs the slip control with a smaller value set as a value of the target slip amount when the slip control is performed while the lockup clutch continues to be held engaged through the continuation process than when the slip control is performed while the fuel cutoff is carried out.

5. The vehicle control apparatus according to claim 1 that performs slip control in which an engagement force of the lockup clutch is subjected to feedback control to make a slip amount of the lockup clutch equal to a target slip amount, and that performs the slip control with the same value as in a case where the fuel cutoff is assumed to be carried out without being stopped, set as a value of the target slip amount, when the slip control is performed while the lockup clutch continues to be held engaged through the continuation process.

* * * * *